UNITED STATES PATENT OFFICE.

PHILIPPE CHUIT AND FRITZ BACHOFEN, OF GENEVA, SWITZERLAND, ASSIGNORS TO CHUIT, NAEF & CO., OF GENEVA, SWITZERLAND, A FIRM.

PROCESS OF MAKING ALPHA-IONONE.

SPECIFICATION forming part of Letters Patent No. 702,126, dated June 10, 1902.

Application filed September 25, 1901. Serial No. 76,552. (No specimens.)

*To all whom it may concern:*

Be it known that we, PHILIPPE CHUIT and FRITZ BACHOFEN, residing at the Usine de la Queue d'Arve, Geneva, Switzerland, have invented an Improved Process for the Preparation of Alpha-Ionone, of which the following is a specification.

This invention relates to an improved process for the preparation of alpha-ionone, and has for its object to obtain said compound in a high state of purity and with a much larger yield than can be obtained by any of the hitherto known processes.

As known, lemon-grass oil contains an aldehyde called "citral." This citral forms in the presence of acetone by the action of alkaline solutions, as first shown by Tiemann, (*Berichte der Deutschen Chemisch. Gesellschaft*, 1893, page 2,692,) a new derivative, the pseudo-ionone. This same pseudo-ionone can be prepared by the action of other appropriate agents on a mixture of citral and acetone. By the action of acids the pseudo-ionone is converted into a mixture of isomerics, alpha and beta ionones, but by all hitherto known processes the result is either a relatively large proportion of the alpha modification with a small yield or a very incomplete conversion of the pseudo-ionone or a more favorable conversion of the latter, but a relatively large proportion of the beta modification.

According to our invention by the use of phosphoric acid, preferably in the form of concentrated syrup, (D=1.750, say 63° Baumé,) while keeping the temperature of the mixture below 0° centigrade during the process, the conversion will be complete and the oil obtained with an exceedingly favorable yield (eighty per cent. of the pseudo-ionone) consists chiefly of alpha-ionone.

The raw oil distilled in the steam consists of about eighty per cent. of alpha-ionone and twenty per cent. of beta-ionone and produces with para-bromphenylhydrazin, a derivative which melts directly at 134° centigrade and after a single recrystallization in methyl alcohol at 142°, while, furthermore, it forms with para-tolylhydrazin a para-tolylhydrazone, melting directly at between 123° and 126° centigrade, and after a single recrystallization in diluted methylic alcohol at 132° centigrade, whereas para-tolylhydrazone of the beta modification melts at 103° to 106° centigrade. This process therefore constitutes a very important technical improvement for the production of ionone, and particularly of the alpha modification thereof. Practically the same result may be obtained with the use of pyrophosphoric acid with a density of 1.718 at about 25° centigrade as with the phosphoric acid, with the difference, however, that by the use of the former acid the refrigerating mixture may be dispensed with and the conversion of the pseudo-ionone can be effected at ordinary temperature.

From the ionones produced in accordance with this improved process the alpha modification thereof can be obtained in a very high state of purity, as shown exteriorly by the completely colorless appearance and its exceedingly fine odor. This can be effected by boiling or by continuously agitating and heating to about 100° centigrade the raw oil with a solution of bisulfite or sulfite of sodium with an addition of ammonium chlorid. The oil is dissolved in about eight hours. After extracting the impurities with a suitable agent there is added to the solution, while still hot, a sufficient quantity of sodium chlorid to saturate it when cold, the alpha-ionone crystallized, so to speak, quantitatively in cooling, in the form of a compound having the appearance of nacreous spangles or scales, which are then filtered off, while the beta modification under these conditions remains in the mother-lye.

The alpha-ionone and the beta-ionone can be obtained by decomposing the crystals and the mother-lye, respectively. This constitutes a very effective and new separation of the two modifications, which differs entirely from the prior art.

When the crystallized alpha compound is decomposed by ordinary means and distilled in steam, a pure and completely colorless alpha-ionone is obtained, in which condition it has not heretofore been produced. The absence of color is not momentary in the manner of certain freshly-distilled essences, but is permanent.

We will now proceed to give, by way of example, one method of carrying this invention into effect.

62.5 parts of syrupy phosphoric acid are cooled to a temperature of between −2° to −5° centigrade and 12.5 parts of pseudo-ionone are gradually added, the mixture being constantly agitated. After a further agitation for about two to three hours the rather thick mixture, which now has assumed a reddish-brown color, is finally diluted with a sufficient quantity of ice and water to form an acid of about fifty per cent. By distilling this mixture in steam about ten parts of a yellowish oil are obtained. The oil is then dissolved in the following mixture: thirty parts of bisulfite of sodium of 40° Baumé, ten parts of water, 2.5 parts of a thirty-per-cent. solution of caustic soda, and three parts of ammonium chlorid by either agitating at about 100° or by boiling the whole for about eight or nine hours and then removing the impurities by means of ether, preferably by diluting it with an equal volume of water. While the solution is hot, a sufficient quantity of sodium chlorid is introduced and dissolved to completely saturate the mixture when cold. Upon the mixture being cooled all the alpha-ionone contained in the original oil is precipitated out in the form of the sodium salt of the hydrosulfonic acid in white nacreous scales, which are then filtered off from the mother-lye. The latter should contain sufficient salts to possess a specific gravity of at least 1.230 at twenty degrees, this being a necessary condition for obtaining the complete precipitation of all the alpha-ionone. If desired, the compound may be recrystallized by means of hot water, in which the combination is readily soluble. The crystals are afterward decomposed by means of a solution of caustic soda or by any other known means and distilled in steam. The pure alpha-ionone thus obtained distils over with great facility with the steam. By decomposing the mother-lyes which contain beta-ionone under the form of the sodium salt of the hydrosulfonic acid the beta-ionone can be obtained as a by-product.

The separation, as shown in the art, gives by means of crystallization of the hydrosulfonic salts only an insufficient separation, as a large part of the alpha-hydrosulfonic salts remain in the mother-lye. The distillation of the beta-ionone out of the remaining solution of the two modifications is not very exact and effective, the alpha-ionone extracted out of the remaining solution not being pure. With our invention—i. e., by adding sodium chlorid in sufficient quantity to the solution to obtain a saturated liquid when cold—the separation is quantitative. The sodium salt of the alpha-hydrosulfonic acid which contains the alpha-ionone, the principal product of our process, is precipitated quantitatively, the sodium salt of the beta-hydrosulfonic acid remains in the mother-lye.

We claim as our invention—

1. The herein-described process of producing alpha-ionone, consisting in reacting on pseudo-ionone with syrupy phosphoric acid at a low temperature, treating the product with a sulfite of sodium in the presence of ammonium chlorid, adding sodium chlorid and precipitating quantitatively from the thus-obtained mixture the sodium salt of the hydrosulfonic acid of the alpha-ionone, and decomposing the same by suitable methods to yield alpha-ionone in a pure and entirely colorless form, substantially as described and for the purpose specified.

2. The herein-described process of producing alpha-ionone from a mixture of cyclic-isomerics consisting in treating the said mixture with a sulfite of sodium in the presence of ammonium chlorid, adding sodium chlorid and precipitating quantitatively from the thus-obtained mixture the sodium salt of the hydrosulfonic acid of the alpha-ionone, and decomposing the same by suitable methods to yield alpha-ionone in a pure and entirely colorless form, substantially as described and for the purpose specified.

In testimony that we claim the foregoing as our invention we have signed our names in presence of two subscribing witnesses.

PHILIPPE CHUIT.
FRITZ BACHOFEN.

Witnesses:
  E. IMER-SCHNEIDER,
  S. H. MININER.